F. L. RAPSON.
HOOD OR COVER FOR MOTOR ROAD AND OTHER VEHICLES.
APPLICATION FILED SEPT. 10, 1919.

1,360,579.

Patented Nov. 30, 1920.
3 SHEETS—SHEET 1.

Inventor
F. L. Rapson

F. L. RAPSON.
HOOD OR COVER FOR MOTOR ROAD AND OTHER VEHICLES.
APPLICATION FILED SEPT. 10, 1919.
1,360,579.
Patented Nov. 30, 1920.
3 SHEETS—SHEET 2.
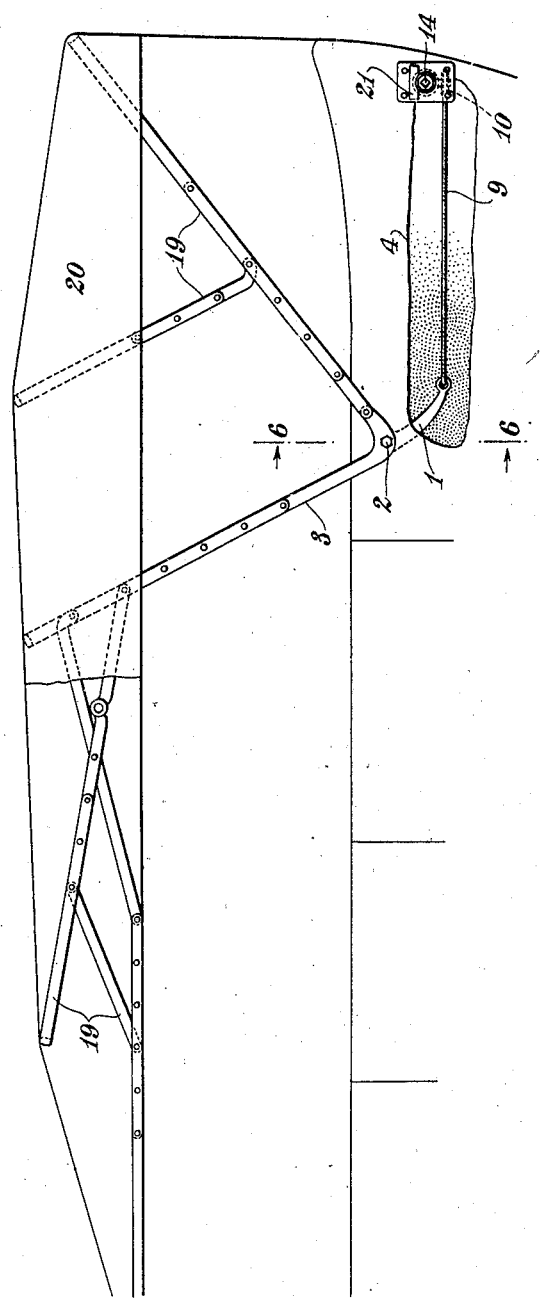
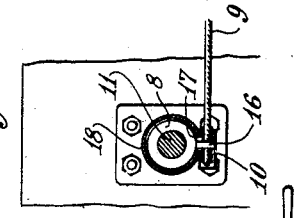
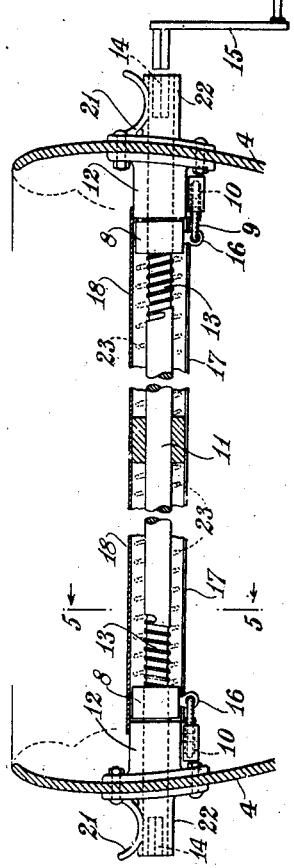
Inventor
F. L. Rapson
by [signature]
His Att'y F. L. RAPSON.
HOOD OR COVER FOR MOTOR ROAD AND OTHER VEHICLES.
APPLICATION FILED SEPT. 10, 1919.
1,360,579.
Patented Nov. 30, 1920.
3 SHEETS—SHEET 3.
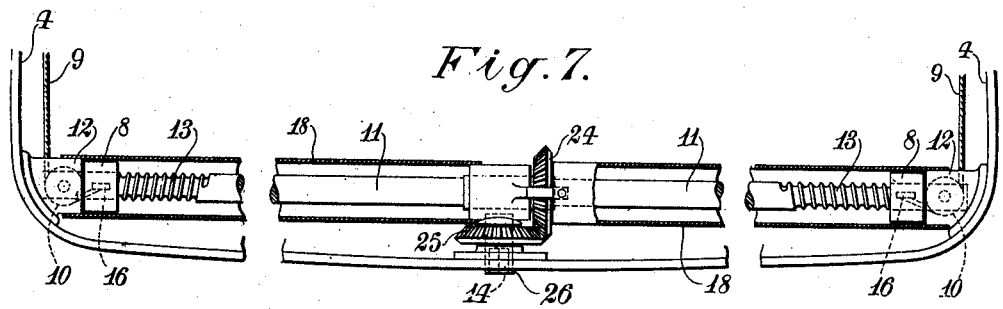
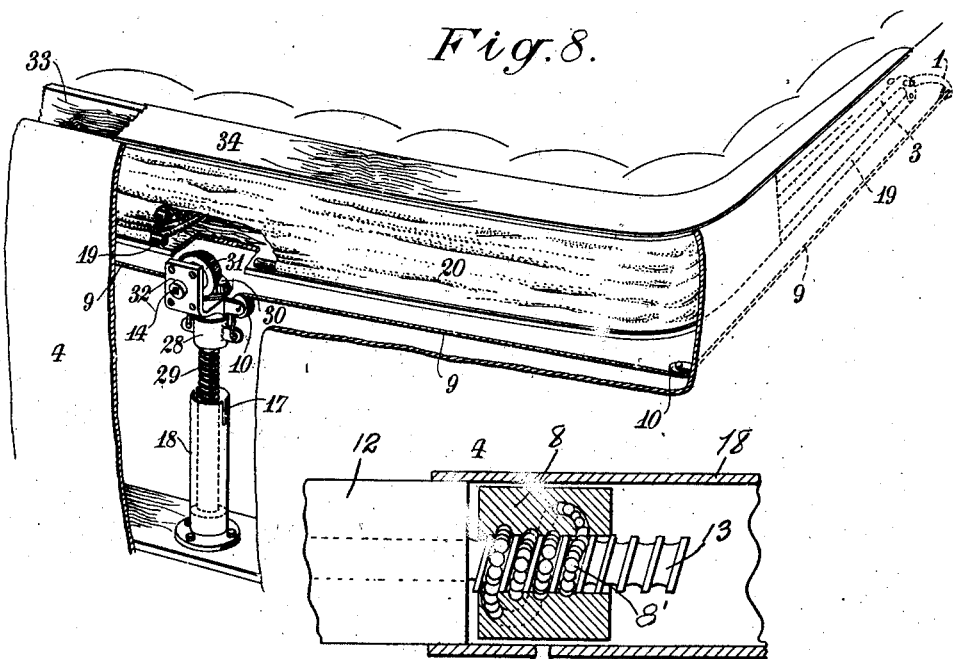

UNITED STATES PATENT OFFICE.

FREDERICK LIONEL RAPSON, OF LIVERPOOL, ENGLAND.

HOOD OR COVER FOR MOTOR ROAD AND OTHER VEHICLES.

1,360,579.    Specification of Letters Patent.    Patented Nov. 30, 1920.

Application filed September 10, 1919. Serial No. 322,979.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Hoods or Covers for Motor Road and other Vehicles, of which the following is a specification.

This invention relates to hoods or covers for motor road and other vehicles.

The object of the present invention is to provide efficient and simple means to enable the hood or cover of any vehicle to be raised by simply inserting a small winch handle and turning the same with ease.

A further object of this invention is to provide a hood which can be stowed away in the rear of the vehicle in an improved manner.

According to this invention one of the rear hoops or struts of the hood, to which are connected the other struts or hoops, straps and cover, is adapted to be raised through the medium of flexible means connected to a block or blocks slidably mounted on a rod or shaft which is adapted to be rotated by a winch handle or the like.

The invention will now be described with reference to the accompanying drawings, in which:—

Fig. 3 is a sectional side elevation showing the hood in its raised position for use;

Fig. 4 is a detail sectional rear elevation of the hood raising means shown in Fig. 1;

Fig. 5 is a cross section taken on the line 5—5 of Fig. 4;

Fig. 6 is a cross section taken on the line 6—6 of Fig. 3;

Fig. 7 is a sectional plan of a slightly modified construction;

Fig. 8 is a sectional perspective view of a further modified construction, showing the rear portion of the hood in the lowered position.

Fig. 9 is a sectional detail showing the anti-friction ball connection between the block and shaft.

Figure 1:
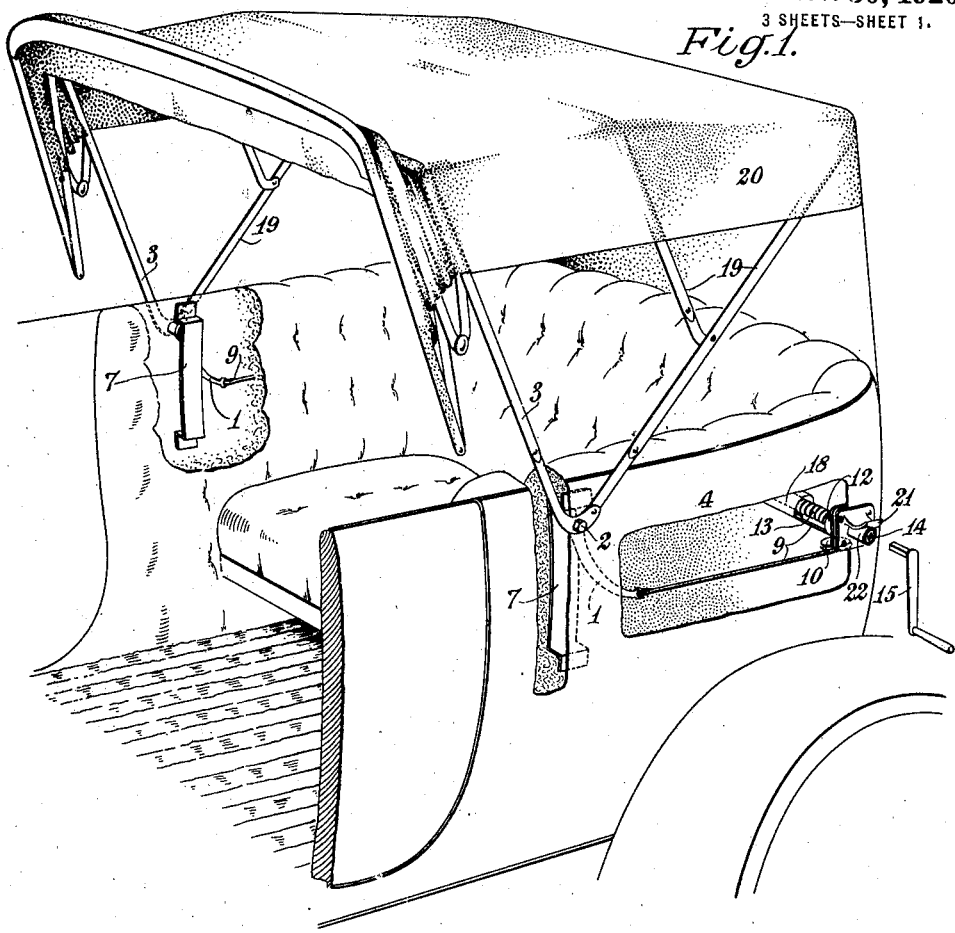
Figure 1 is a sectional perspective view showing one form of hood raising device, the rear part of the hood being fully raised.
Figure 2:
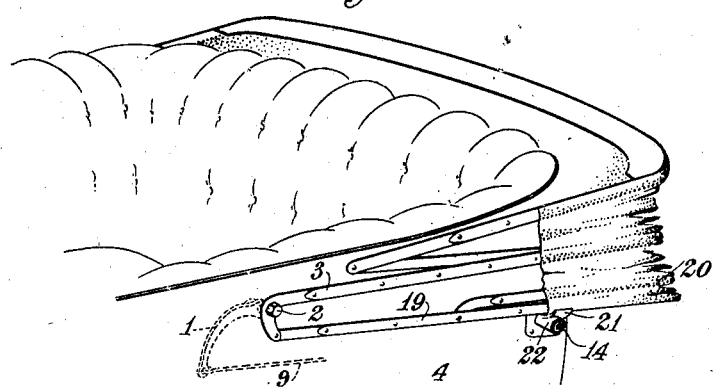
Fig. 2 is a perspective view showing the hood in its closed position.

According to one form of this invention as shown in Figs. 1 to 6, a curved or otherwise suitably shaped arm 1 is attached to one of the rear hoops of the hood or cover or to the swivel pin 2 carrying the hoop 3 at each side of a motor car or other vehicle. These arms 1 are preferably disposed in the body or framework of the vehicle and each swivel pin 2 is rotatably mounted in a bearing 5 in the outer framework 4 and in a bearing 6 carried by a bracket 7 secured to the framework. Each arm 1 is connected to a block or nut 8 by a previously tensioned cable 9, passing around suitable guide pulleys 10. These blocks 8 are slidably mounted on a rod or shaft 11 which is rotatably mounted in suitable bearings 12 at each end. This rod or shaft 11 is disposed horizontally and transversely of the vehicle and preferably in the framework or body 4 at the rear of the vehicle. One end of the rod or shaft 11 upon which one block 8 is mounted, is formed with a right handed helical groove 13 and the other end upon which the other block 8 is mounted is formed with a left-handed helical groove 13. The blocks 8 are formed with coöperating internal helical grooves for the reception of anti-friction balls 8' which are preferably returned and circulated through a channel or pipe provided or formed in the said block 8. A square or other suitably shaped hole 14 is provided in each outer end of the rod or shaft 11 for the reception of a detachable winch handle 15. The blocks 8 are preferably guided and prevented from rotating by providing each block with a downwardly extending projection 16 which is adapted to slide in a longitudinal slot 17 cut in a covering tube 18 which is adapted to inclose the threaded portions of the rod or shaft 11. The hoops 19 and other hood carrying means are connected to the hereinbefore described hoop 3 and are arranged in any suitable or usual manner for a hood or cover 20 of any desired type such as for a cabriolet, landaulette, or other type of car. The hood 20 when in its closed position is adapted to lie around the rear of the vehicle as usual. The curved arm 21 which forms a rest for the hood 20 when in its closed position is preferably formed in one with an outer bearing 22 of the shaft 11 as shown in Figs. 1 to 4.

In operation and when it is desired to raise the hood 20 the detachable winch handle 15 is inserted in the squared hole 14 in the shaft 11 at the side of the vehicle and turned. This action will rotate the threaded shaft 11 and move the blocks 8 inwardly and raise the hood 20 through the medium of the cables 9 which are connected to the arm 1 secured to the swivel pin 2 carrying the hoop 3. When the said hoop 3 passes over its vertical position the rear portion of the cover 20 will automatically assume its open position.

If desired, and as preferred, helically coiled compression springs shown in dotted lines at 23 could be mounted on the shaft 11 to return the running blocks 8 to their normal position immediately after the hood 20 has been raised. Thus these springs 23 would only be under compression during the lifting operation.

In a slightly modified construction as shown in Fig. 7 a bevel wheel 24 is secured on the shaft or rod 11 between the ends thereof and this bevel wheel 24 is in mesh with another bevel wheel 25 secured on a shaft 26 which is rotatably mounted in the rear of the vehicle body. This shaft 26 is formed with a squared hole 14 for the reception of a winch handle 15 which is rotated as previously described, to raise the hood.

In a further modified construction, as shown in Fig. 8, the rear ends of the cords or cables 9 which pass around suitable guide pulleys 10 are connected to a block 28 which is adapted to be moved on a vertical rod or shaft 29 rotatably mounted in a well or recess formed or provided in the rear of the vehicle body 4. This rod or shaft 29 is provided preferably at its upper end with a bevel wheel 30 which is adapted to be engaged by a transversely disposed bevel wheel 31. This latter bevel wheel 31 is mounted on a transverse shaft 32 which is formed with the recess 14 for the reception of the squared end of the detachable winch handle or the like 15 as previously described. This handle is similar to that used for operating my improved jacks and detachable wheel described in my previous applications. The rod 29 and block 28 are formed with coöperating helical grooves for the reception of anti-friction balls or rollers. These balls or rollers are returned and circulated through the block or if desired through a spiral tube wound around the block 28; a suitable wick lubricator may be fitted on the tube to lubricate the balls during their motion through the circulating tube and block.

In this construction the hood 20 and the hoops 3 and 19 are disposed in a recess 33 formed in the rear of the vehicle body when the hood is in its lowered position. The forward ends of the strengthening straps and front portion of the hood 20 are connected to a suitably curved member 34 which is adapted to be secured by clips or the like or in any convenient manner, when in its position for use, to the front wind screen or form a lid or cover plate for the recess 33 in the rear of the vehicle when the cover is collapsed and disposed in the said recess 33. Thus the underside of this curved member 34 will form the upper side of the cover of the recess 33 when the hood 20 is in its normal or closed position. After the hood 20 is raised the lower edge of the rear curtain of the hood will be loose; therefore it is necessary to detachably secure it to the rear of the vehicle by turnbuttons or the like to prevent rain from running down the back into the recess 33. Before the hood 20 is lowered the said lower edge is released to enable the rear portion of the hood to be folded in the recess. If desired, an additional cover may be provided to inclose the recess 33 when the hood 20 is in its raised position.

In operation and when it is desired to raise the hood 20 the detachable handle 15 is inserted in the squared recess 14 at the rear of the vehicle and rotated. This action will raise the entire hood 20 from the recess 33 and the front curved member 34 is pulled forward by hand and turned over so that it may be secured by the clips to the front wind screen. Detachable curtains may be provided to cover the spaces at the sides of the hood if so desired. When it is desired to lower the hood 20 the curved member 34 is released from engagement with the wind screen and the lower edge of the rear curtain is released. The weight of the hood will then automatically return it to the recess 34 without the use of the handle 15 the block 28 running down the shaft 29 through the medium of the anti-friction thread.

It will be understood that the hood in each construction will be lowered automatically when the front of the said hood is released and the operating hoop is turned over beyond its vertical position.

Hood or cover operating means constructed according to this invention will last the lifetime of any car when it is taken into consideration that the hood is not raised and lowered more than once or twice a day. No lubrication whatever will be necessary if the bearings are greased before the device is fitted.

What I claim is:—

1. A vehicle having a foldable top, arms connected to the top for moving said top in the operation of the arms, a shaft mounted for rotation, members mounted on said shaft for relatively opposite movement in the rotation of said shaft, means surrounding said shaft and coöperating with said members to hold the members against rotative movement and flexible connections between said members and arms.

2. A vehicle having a foldable top, arms connected to the top for moving said top in the operation of the arms, a shaft mounted for rotation, members mounted on said shaft for relatively opposite movement in the rotation of said shaft, and flexible connections between said members and arms, and means for automatically actuating said members in one direction when said members have been fully actuated to operate said arms.

3. A vehicle having a top adapted for folding and extension, arms operable for extending the top, a manually operable shaft mounted in the vehicle, members mounted on said shaft for relatively opposite movement in the operation of the shaft, flexible connections between said members and arms, whereby in a particular movement of said members the arms are operated to extend the top, and means for automatically operating said members when said members have been fully actuated to operate said arms to fully relieve the tension on said connections to permit folding of the top without operating said members.

4. A vehicle having a foldable top, arms connected to the top for moving said top in the operation of the arms, bearings mounted exteriorly of the body in line transverse the body, said bearings having their upper surfaces formed to receive and support the bows of the top with said top for folding, a shaft mounted in said bearings, members mounted on the shaft for relative operative movement in the rotation of said shaft, means for holding said members against rotation during their movement, and a flexible connection between each of said members and the arm of the top.

In testimony whereof I have hereunto signed my name.

FRED LIONEL RAPSON.